United States Patent [19]

Rypinski

[11] Patent Number: 4,803,485
[45] Date of Patent: Feb. 7, 1989

[54] LAN COMMUNICATION SYSTEM AND MEDIUM ADAPTER FOR USE THEREWITH

[75] Inventor: Chandos A. Rypinski, Tiburon, Calif.

[73] Assignee: AMP Incorporated, Harrisburg, Pa.

[21] Appl. No.: 28,946

[22] Filed: Mar. 23, 1987

[51] Int. Cl.$^4$ .......................... H04Q 9/00; H04J 3/00
[52] U.S. Cl. ............................ 340/825.050; 370/86; 375/36; 178/2 C
[58] Field of Search ...................... 340/825.05, 825.01, 340/825.8; 370/15, 16, 31, 86, 85; 178/2 C; 371/11; 375/36, 7; 379/272, 399, 400, 402, 414, 417

[56] References Cited

U.S. PATENT DOCUMENTS

| 4,561,092 | 12/1985 | Shaver | 340/825.05 |
| 4,697,047 | 9/1987 | Hirai et al. | 375/7 |
| 4,704,714 | 11/1987 | Tomizawa et al. | 370/15 |
| 4,707,829 | 11/1987 | Pendse | 370/86 |

FOREIGN PATENT DOCUMENTS 3507618  3/1985  Fed. Rep. of Germany .

OTHER PUBLICATIONS

EPO Search Report DTD 01/29/88.
IBM Tech Bulletin, vol. 29, No. 3, dtd Aug. 1986, pp. 1356-1360.
Paper Entitled "The Application of Local Area Networks to the Control Arch. of a Telephone Exchange". Abstract of a Pat. Apl. Entitled: "Data Transmitting Device".
"Philan: a Fiber-Optic Ring for Voice and Data", IEEE Communications Magazine, vol. 24, No. 12, Dec. 1986.
"Making the Lan. Connection with a Fiber Optic Standard", Computer Design, Sept. 1, 1985.

Primary Examiner—Donald J. Yusko
Attorney, Agent, or Firm—David L. Smith

[57] ABSTRACT

A communication system, medium adapter (10) for use therewith, and methods are provided which permit standard ring network transmission media (15) to support both ring and bus communication topologies and protocols, which may be selectively adapted to differing topologies and protocols without physical modification. Means (50) are provided for permitting each medium adapter (10) to maintain a continuous ring communication path in a quiescent state, and to break the ring and establish bus communication both originating and terminating at the transmitting adapter in a transmit state. The medium adapter provided may be used with existing 802.5 token-ring dual twisted pair wiring (19), while supporting existing 802.3 CSMA/CD, 802.4 token bus, or 802.5 token-ring interface hardware, among others.

24 Claims, 4 Drawing Sheets

LAN COMMUNICATION SYSTEM AND MEDIUM ADAPTER FOR USE THEREWITH

BACKGROUND OF THE INVENTION

1. Field of the Invention

This invention relates to local area network communication systems and medium adapters for use therewith, and more particularly to a ring/bus adapter for supporting multiple LAN topologies and protocols, including variable topologies, using installed ring media topology, and to resulting communication systems and methods.

2. Description of Related Art

Communication systems for interconnection of multiple users within a given geographic boundary, commonly referred to a local area networks (LANs), have found widespread acceptance in many fields for many uses. Initially developed for transmission of data between information processing equipment and related peripherals, LANs are now being used for distribution of voice communication, facsimile transmission, video communication, and machine and process control, among others.

No longer limited to laboratories or data processing centers, LANs are finding increasing use in business office communication, campus interconnection, workstation support, and industrial process and manufacturing control. For example, within an office environment LANs may be used to provide voice (e.g. telephonic) communication, as well as to link workstations and peripherals within the office. In an industrial setting, LANs may be used to communicate process or control commands between automated manufacturing equipment, design workstations, and controllers, as well as to provide other needed data and voice communication.

Typically these differing needs have been answered by providing separate and specialized communication systems for each application, utilizing differing LAN topologies and control protocols. Two basic media topologies are presently in widespread use, bus interconnection and ring interconnection. In a bus configuration, when one station transmits, all other stations receive the transmission. Buses may be considered as passive systems having a continuous effective transmission medium, in which transmissions are available at each connected station. In a ring configuration, in contrast, a station transmits only to the next connected station, which in turn transmits to a third station. A ring may be considered, therefore, as an active system utilizing unidirectional transmissions. Other topologies are also known, which are combinations of these two and possibly with interposed active circuits, but generally suffer from restrictions limiting their usefulness for the applications discussed.

In part because of the fundamental difference between these two basic media topologies, ring and bus, and in part because of differing user requirements for specific applications, several different sets of governing rules, or protocols, have been developed for controlling LAN communication. Principal among these are the three presently recognized standards of the Institute of Electrical and Electronics Engineers (IEEE), as follows:

IEEE 802.3: Bus Collision sensing multiple access with carrier detection (CSMA/CD), e.g. Ethernet;

IEEE 802.4: Bus Token passing, e.g. data link portion of

Manufacturing Automation Protocol (MAP); and

IEEE 802.5: Ring Token passing, e.g. International Business Machines (IBM) (trademark) Token-Ring Network.

Other access methods, such as method for providing isochronous communication over ring topologies, are also possible utilizing time division multiplex (TDM) and/or frequency division multiplex (FDM) schemes (see, e.g., Brandsma et al., "Philan: a Fiber-Optic Ring for Voice and Data," IEEE Communications Magazine, Vol. 24, No. 12, December 1986).

While these standards and associated communications systems have provided the user with solutions to many specific needs, systems themselves are largely incompatible. Thus a computer interface board designed to support the IEEE 802.3 standards cannot be used with an existing LAN including an incompatible transmission medium or media topology, such as an existing IEEE 802.5 token-ring system. This greatly complicates attempts to provide a "universal" LAN within given area, since protocols and related hardware particularly suited to one function may not be best suited to other uses. It is an object of the present invention, therefore, to provide a medium adapter which is capable of being adapted for use with numerous protocols, including the existing IEEE standards, and with existing interface hardware for implementing them.

Present incompatibilities cause serious problems when selecting LAN wiring to support multiple systems or topologies increases costs several fold. Thus a single LAN medium in a chosen topology is typically selected to meet present needs. Yet needs in a given area may change over time, and the needs in different areas, such as those of different tenants in a building, may differ widely. Since an installation is costly and preferably permanent, election of any existing system seriously impairs both present and future flexibility. For example, a building wired for IEEE 802.5 token-ring LAN cannot now be easily adapted to support bus LAN protocols or 802.3 interface-equipped stations. Similarly, existing hardware for use with one protocol, such as 802.3 interface boards, cannot now be used with other wiring installations, such as 802.5 token-ring wiring. This limits ability to upgrade wiring, or to use existing equipment which represent large investment, with alternative media. It is an important object, therefore, to provide a LAN medium adapter that can be used with a number of existing LAN media and wiring schemes, yet is capable of supporting both ring and bus communications under a number of differing protocols. A related object is to provide a highly flexible LAN communication system and method having these and other features.

Even within a given area, specific needs often change for different times of day or periods of days. For example, it may be desirable for an office LAN to efficiently support interactive data terminals or voice communication during the day, but efficiently transmit large quantities of data between only a few data processing stations at night. Unfortunately, existing network topologies and/or protocols which are best suited for one use may not be ideally suited to the another, requiring compromise in overall efficiency or duplicate systems. It is an object of the present invention to provide a communication system which may be selectively adapted without physical modification to support multiple topologies and protocols, making advantages of each available at different times on the same system.

Further, all existing LAN systems have limitations which users have heretofore accepted. For example, while for certain applications bus topologies offer advantages over rings, there has existed no means for determining whether or not a signal transmitted over the bus is actually propagated and presented to each receiver without distortion. Although protocols exist for collision detection, they may not be responsive, for example, to "lost" signals which fade below reception thresholds or to data corruption that does not effect the legality of the signal. In ring systems, failure of either the receiver or transmitter at a single station may destroy the entire LAN unless costly bypass circuits are provided. Important objects of the present invention are to overcome these and other shortcomings and provide a new LAN topology and system, including a medium adapter, with unique advantages.

Finally, the cost of providing each station of a LAN with necessary interface and adapter circuits has been a limiting factor on widespread adoption of LANs. Thus, a further important object is to provide the benefits discussed above by an inexpensive medium adapter without costly or complex hardware. A related object is to provide such an adapter which is highly reliable, and which may easily be incorporated into an existing LAN installation.

SUMMARY OF THE INVENTION

The foregoing objects and attendant advantages are achieved in general by providing a communication system wherein a continuous ring communication path is created when all nodes of the system are in a first, quiescent state. When one node desires to transmit, it goes to a second, transmit state. The continuous ring transmission path is then broken at the transmitting node, resulting in a new topology in the form of a bus that both originates and terminates at the transmitting node. When finished, the transmitting node returns to the quiescent state and another node may transmit, thereby creating a similar but differing bus topology initiating and terminating at another node. Means may be provided for detecting undesirable simultaneous transmission by multiple nodes, and for verifying accurate transmission over the entire network.

In a preferred embodiment, a medium adapter is provided for use with standard ring or star ring wiring schemes. Each medium adapter is connected to both a first, incoming segment of the transmission medium, and to the next-successive, outgoing segment of the transmission medium. The medium adapter includes means for receiving signals from the first segment, and means for transmitting different or identical signals on the nextsuccessive segment. Means are provided, not including the transmitting means, for selectively maintaining or breaking the continuity of a communication path from the first segment to the next-successive segment. This ring breaking means in a preferred embodiment comprises a pair of low-impedance electronic switches. Means, such as electronic switches, selectively couple or isolate the transmitting means with respect to the next-successive segment. Means may also be provided for selectively coupling or isolating a terminating impedance with respect to the first transmission medium segment.

In operation, the medium adapters have at least a first, quiescent state and a second, transmit state. In the quiescent state, the ring breaking means maintains continuity of a communication path between the first and next-successive segments, while the transmitter coupling means isolates the transmitting means and the terminating impedance coupling means isolates the terminating impedance from the transmission medium. In the transmit mode, the ring breaking means breaks the transmission path at the transmitting station, isolating the first medium segment from the next-successive medium segment, while the transmitter coupling means couples the transmitting means to the next-successive segment and the terminating impedance is coupled to the first segment.

Thus existing ring wiring, such as 802.5 token-ring wiring, may be used to support bus protocols. In fact, by providing optional means for generating appropriate control signals such as collision detection signals, the present medium adapters may be used with such wiring schemes in conjunction with existing 802.3 CSMA/CD interface cards, or other 802.3, 802.4 or other protocols and hardware.

In addition, by causing each medium adapter to simultaneously assume the transmit mode, and providing appropriate means for echoing received messages back to the next-successive segment, the medium adapters of the present invention may also support standard active ring protocols and hardware, such as 802.5 token-ring. Means may be provided for selecting between effective topologies and protocols, in response to control codes provided to each station, such as control words distributed over the communication system itself. Thus a single installation may be selectively used in multiple transmission topologies, supporting multiple communication protocols, without need for physical modification.

These and other features of the present invention will become apparent in connection with the following detailed description of preferred embodiments.

BRIEF DESCRIPTION OF THE DRAWING

FIG. 3 is a block diagram illustrating the communication system of FIG. 1 and the active communication path and transmission topology with station n in a transmit mode;

DESCRIPTION OF THE PREFERRED EMBODIMENTS

Figure 1:
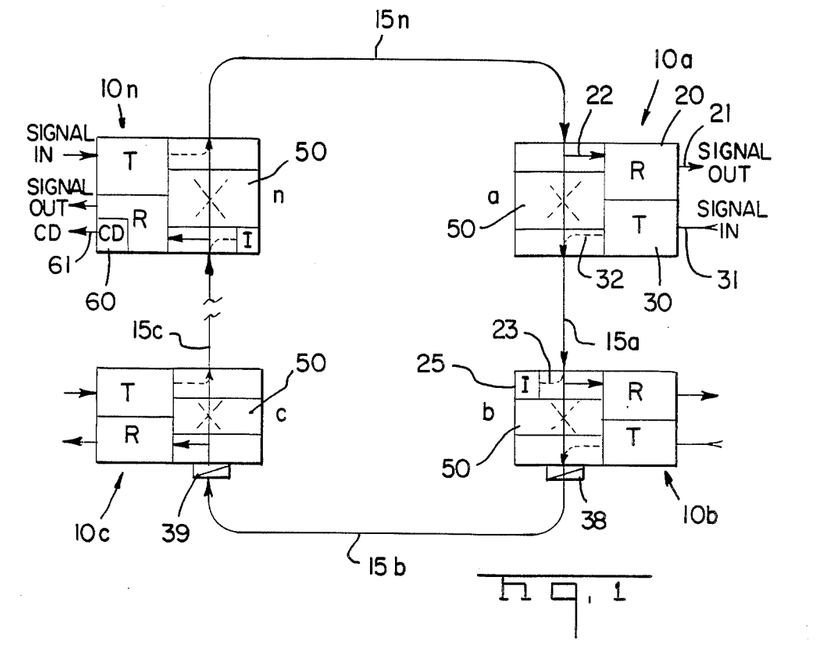
FIG. 1 is a block diagram illustrating a basic communication system and certain alternative embodiments thereof utilizing the present invention.

Referring now to the drawing, wherein like reference numerals designate like or corresponding parts throughout the several views, FIG. 1 shows a diagrammatic representation of a communication system utilizing the present invention. Specifically, a communication network, such as a local area network (LAN), is shown having n stations or nodes. The nodes are serially connected by individual segments 15 of the communication system transmission medium. Such medium may comprise, for example, shielded or unshielded twisted pair wiring, coaxial cable, or optical fiber.

A ring/bus medium adapter 10 is provided at each station to interface and connect the physical transmission medium 15 to the communication equipment (not illustrated) located at the station. For example, LANs today commonly support numerous forms of computer and data processing equipment, as well as telephone, video, facsimile, control and other forms of equipment. Each such device typically has provision for receiving signals from the communication system, and for providing signals for transmission over such system. Typical interfaces include 802.3 AUI (adapter unit interface), 802.4 DTE/DCE, and 802.5 line signal interfaces. Such interfaces are typically included on circuit cards which may include circuitry for supporting the desired LAN protocol.

Each medium adapter 10 includes a means for receiving signals from the transmission medium 15 and providing them to the attached equipment or AUI, such as receiver 20 and output signal 21. Each medium adapter also includes means for transmitting signals over the transmission medium 15, such as transmitter 30 which receives input signals 31 from the attached equipment for transmission to other stations. The receiving and transmitting means may include suitable modems for carrier frequency transmission. Means 22 are provided for coupling the receiving means to the transmission medium 15, while means 32 are provided for coupling the transmitting means to transmission medium 15.

Each ring/bus medium adapter further includes means for selectively maintaining or breaking the continuity of transmission medium 15. For example, a ring breaking means 50($i$) associated with medium adapter 10($i$) provides at least two operative states. In a first, ring maintaining, state, ring breaking means 50($i$) provides a link between the output end of the transmission medium segment 15($i-1$) (which joins medium adapter 10($i-1$) to medium adapter 10($i$)), with the input of transmission medium segment 15($i$) (which joins medium adapter 10($i$) with the next-successive medium adapter 10($i+1$)). Thus when all ring breaking means 50$a$-$n$ are in the first state, the transmission path created is an unbroken ring. Further, when each ring breaking means 50($i$) is in the first state, signals received from transmission medium segment 15($i-1$) are supplied directly to the input of medium segment 15($i$).

Each ring breaking means 50 further provides a second, ring breaking, state. Specifically, when a ring breaking means 50($i$ is in the second state, the input to transmission medium segment 15($i$ is isolated from the output of preceding medium segment 15($-1$). Signals received by the network adapter 10($i$) are not transmitted to successive nodes, and the transmission ring is broken Thus when any ring breaking means 50 is in the second state, the ring transmission topology is broken and a bus transmission topology is created. The bus both begins and terminates at the node associated with the ring breaking means 50 which is in the second state as discussed, thereby forming a communication bus in the form of a loop such that the station involved may both transmit over the transmission medium 15 and receive its own transmission therefrom. These matters are discussed more fully in connection with FIGS. 2 and 3, below.

FIG. 1 further illustrates a preferred alternative embodiment for a medium adapter 10 which further includes a terminating impedance 25 and means 23 for selectively coupling the terminating impedance 25 to the output of the next-preceding medium segment 15. For metallic transmission media it is desirable to provide a terminating impedance which matches the impedance of the media itself, in order to prevent signal reflections. Operation of terminating impedance 25 and coupling means 23 is discussed more fully in connection with FIG. 2 and 3, below.

FIG. 1 further illustrates optional transducers 38, 39. As previously noted, the present invention may be utilized with any common transmission media. When such medium is an electrical medium, such as twisted pair wiring or coaxial cable, all signals are conducted and processed in electrical form. For example, ring breaking means 50 may operate by electrically connecting or isolating the associated transmission medium segments 15($i-1$) and 15($i$). If the transmission medium 15 comprises optical fiber, ring breaking means 50 may provide for optically connecting or isolating the respective medium segments. Alternatively, when an optical link such as segment 15$b$ is desired, transducer 38 at medium adapter 10($b$) may be an electrical-to-optical transducer, while a corresponding optical-to-electrical transducer 39 may be provided at medium adapter 10$c$. Thus differing media may be used, alone or intermixed with others. Other communications media, such as waveguides, could also be utilized. For example, standard #26 or #24 B&S American Wire Gauge unshielded twisted pair wiring, such as commonly used for telephone interconnection, may be used by providing two pairs at each station. Thus, the present system and adapters 10 may be used with existing wiring for Starlan (trademark) (802.3 1base5) installations, by providing looping interconnections between wire lobes in place of the typical active Starlan hub or server. Existing 2-coaxial cable head-end bus wiring may also be used by closing the "tail" end to create a closed path in the quiescent state. These examples are illustrative only and are not limiting or exhaustive.

The medium adapters 10 and the communication system described above are not limited to any specific communication protocol. In fact, the system shown may be used with attached station equipment utilizing numerous protocols. For example, as discussed more fully in connection with FIG. 5, the medium adapters 10 may be used in a preferred embodiment with attached equipment having an AUI supporting IEEE 802.3 CSMA/CD protocol. IN such a system collision detection is typically determined by circuitry incorporated in existing transceivers, such as standard 802.3 10base5 or 10base2 (e.g. Ethernet) transceivers with average signal voltage monitoring. The present invention replaces the physical medium and transceivers in such known systems, and may provide optional means 60 for detecting collisions and generating a status signal 61 to be provided to standard 802.3 interfaces when a collision is detected.

Figure 2:
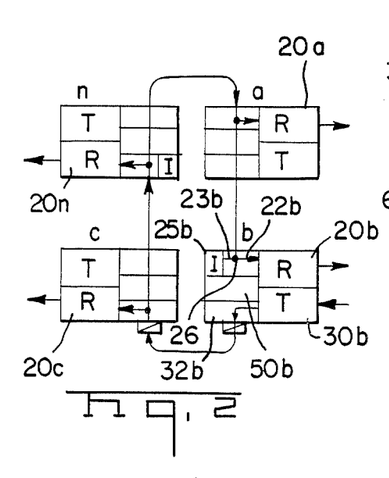
FIG. 2 is a block diagram illustrating the communication system of FIG. 1 and the active communication path and transmission topology with station b in a transmit mode.

Operation of the present invention may now be understood with references to FIGS. 1, 2 and 3. FIGS. 2 and 3 show the communication system of FIG. 1 in identical physical form. As previously noted, when all ring breaking means 50 are in their respective first states, the transmission medium 15 is continuous and forms a complete ring. At the same time, receiver coupling means 22 couple the receivers 20 to the transmission medium 15 so that each station may monitor the communication system via output signal 21 provided by the associated medium adapter 10. For purposes of the following discussion this may be considered as the quiescent state or mode of the communication system and of the individual medium adapters.

Further, when in the quiescent mode, transmitting means such as transmitters 30 are isolated from the transmission medium 15 by the transmitter coupling means 32. The transmitting means may comprise any of a number of known means for imposing signals on the transmission medium. For example, it may comprise a controlled voltage source for imposing baseband signals on the transmission medium, or may comprise a carrier frequency modem, such as cable system RF television transmitter for supporting broadband transmission. Such transmitting means typically have low output impedance when off, which could divert power from the transmission path and attenuate the signal propagated along the network. Thus transmitter coupling means 32 provides for high impedance isolation of the transmitters 30 to maintain the desired low attenuation signal path.

Similarly, during the quiescent state terminating impedances 25 are isolated by terminating impedance coupling means 23 so that power is not diverted or attenuated on the transmission medium 15.

Many known systems couple receivers to the transmission medium by means of impedance matching and power dividing taps. Such taps introduce losses of 12–18 db at each connection, requiring a higher level transmitter for a given line signal level. In contrast, the present invention provides a low impedance coupling, resulting in no loss between the transmitter and the line, and between the line and the high impedance receiver input. Since the signal avoids power dividing tap loss, the increased gain can be used to offset additional losses from use of high frequencies or an increased number of stations.

In contrast to normal ring configurations where each node is active, in bus mode quiescent state the medium adapters of the present invention may in preferred embodiments passively propagate the communication signal. Thus transmission times are reduced and reliability is enhanced by eliminating multiple receivers and transmitters.

When a station desires to transmit, the transmission topology of the communication system is altered by operation of the ring breaking means 50. FIG. 2 illustrates communication by station b. The resulting transmission path or topology, as well as all means and signals active during the transmission, are highlighted by dark lines. Those means and signals that are not active or that are isolated from the active communication function are omitted or unhighlighted.

When the equipment attached to medium adapter 10b desires to transmit a signal to another attached station, it provides the data to medium adapter 10b. The adapter then switches from its quiescent mode to its second, transmit mode or state. In this transmit state, ring breaking means 50b is changed to its second, ring breaking, state, isolating the output of media segment 15a from the input of segment 15b. This breaks the ring at medium adapter b, and results in a signal path having a bus topology, no longer a continuous ring. Transmitter coupling means 32b connects the transmitter 30b to the source end of the resulting bus, which is the input to transmission medium segment 15b as illustrated. All other stations remain in their respective quiescent states, so that the signal transmitted by transmitter 30b is transmitted sequentially over all transmission medium segments 15 and through all medium adapters 10. At each medium adapter, the respective receiver 20 is coupled 22 to the bus, so that each station receives the transmitted message.

Since the quiescent state ring is broken only by ring breaking means 50b, both the source end and the terminal end of the resulting bus are located at medium adapter 10b. The source end is connected via low impedance coupling means 32b to the transmitter, and therefore requires no additional termination to prevent reflections. However, when ring breaking means 50b is in its second state, the terminal end 26 of the resulting bus is open and unterminated. To prevent signal degradation and reflection, means are provided for applying an appropriate terminating impedance 25b to the terminal end 26. In the embodiment shown, terminating impedance coupling means 23b couples terminating impedance 25b to the terminal end 26 when medium adapter 10b is in its transmit mode.

Receiver 20b is also preferably coupled 22b to the bus, so that medium adapter 10b and the attached equipment at station b may monitor the system for its own transmission. As discussed more fully in connection with FIG. 5, this provides a unique benefit. In normal bus networks, a transmitting station may monitor the bus for collisions indicating an unsuccessful transmission attempt. However, failures may occur on the bus which prevent reliable reception by all stations, without generating a detectable collision, such as excessively attenuation. This is true even on two cable head-end buses for stations remote from the transmitter with respect to the head-end.

In contrast, the present bus network provides a continuous looping communication bus in which a station can monitor its own transmission after the signal has travelled through the entire network. Since the loop is passive, the signal received by receiver 20b will be an accurate representation of the transmitted signal only if the signal present at each intervening network adapter was similarly valid. Any break or excessive attenuation in the network will prevent the signal from returning. Thus the present invention provides a manner whereby a transmitting station can verify that its signal was accurately presented to each other station on the network. Since the medium adapters 10 utilize high input impedance receivers without lossy couplers, there is a very high probability that receipt of a valid return message indicates valid reception by each remaining station as well. While such verification may also be possible on existing active networks, the present communication system provides for such verifiable reliability on a passive transmission medium without a large number of active repeaters.

When station b is finished with its transmission, medium adapter 10b returns to its first, quiescent state. Ring breaking means 50b returns to its first state, coupling means 32b isolates transmitter 30b from the transmission medium 15, and terminating impedance 25b is isolated from the transmission medium 15 by coupling means 23b. Receiver 20b remains coupled to the transmission medium. Thus the system is returned to its quiescent state and ready to handle another transmission.

Referring now to FIG. 3 and comparing the active transmission path highlighted therein to the active path highlighted and previously discussed in connection with FIG. 2, a unique feature of the present invention is shown. Specifically, in FIG. 3 station n desires to transmit a signal on the network. Medium adapter 10n therefore goes to its second, transmit state, and ring breaking means 50n breaks the ring at node n as shown. This again results in a bus topology, but now the bus initiates and terminates at station n, rather than station b. Thus the present system differs entirely from known loop or bus communication systems wherein the start and end points are fixed. In contrast, the transmission topology of the system provided by the present invention differs for each respective transmitting station, and loop communications over unidirectional buses tailored for each station are provided without need for a central controller. This makes possible to every station the benefits previously discussed in connection with FIG. 2.

Figure 4:
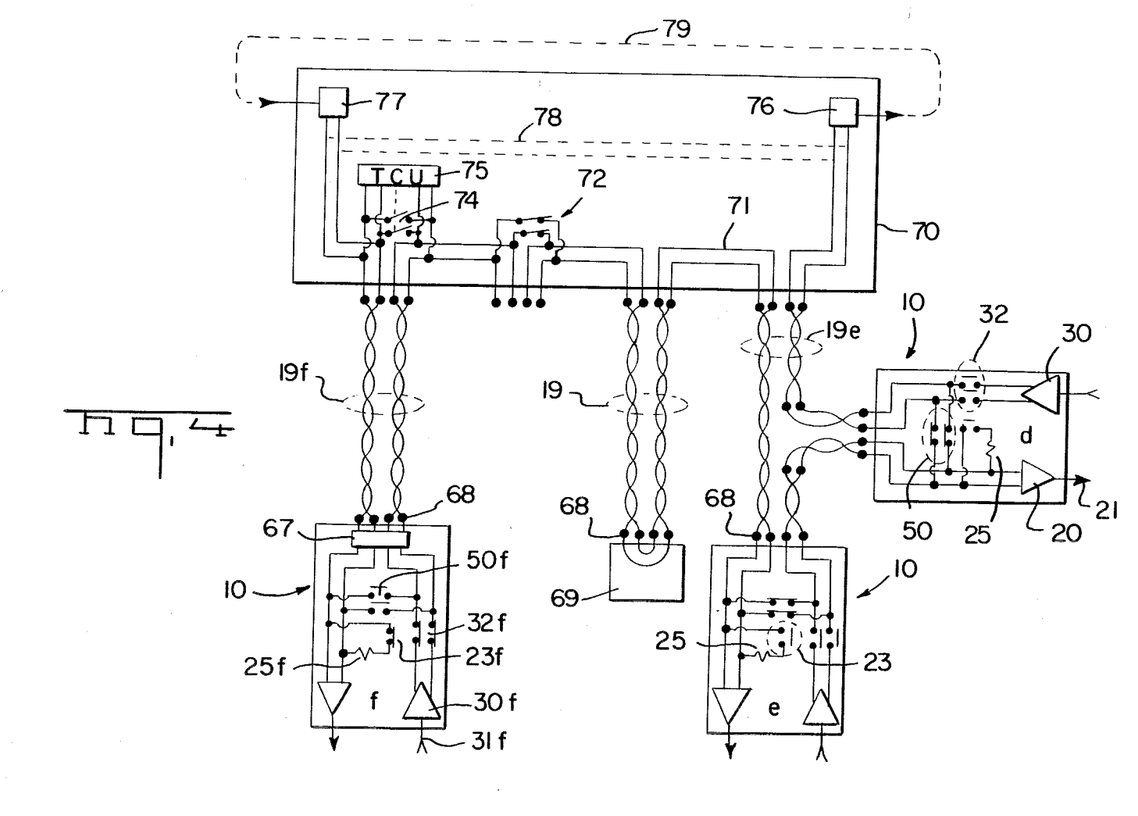
FIG. 4 is a block diagram showing a communication system utilizing a standard transmission medium in conjunction with medium adapters according to the present invention.

In addition to the many benefits previously noted, the use of medium adapters 10 allows standard ring media topology wiring schemes to provide communication systems having the benefits and features discussed. Referring to FIG. 4, for example, a specific preferred embodiment is illustrated showing use of the medium adapters 10 with a wiring scheme commonly provided in support of IEEE 802.5 token-ring protocol, such as IBM Token-Ring Network.

The wiring architecture for the IBM Token-Ring Network is typically a star-ring configuration. All stations are wired to one of multiple possible wiring concentrators 70. Wiring lobes 19 extend from the wiring concentrator 70 to individual station locations, such as wall outlets or floor mounts, where connectors 68 are provided for attachment of station equipment and adapters. The wiring lobes provide separate send and receive paths to support unidirectional ring communication, preferably via dual shielded pairs. Wiring lobes are generally single drop, and are serially joined by connections 71, 72, or 74 within the wiring concentrators 70 to create a continuous path. If only one wiring concentrator is used, the loop may be closed internally by path 78. If additional wiring concentrators at other locations are desired, input and output repeaters 77, 76 join the concentrator 70 to other via serial links to create a closed loop, as shown diagrammatically by path 79.

Because the standard 802.5 protocol requires a ring topology, means are provided to assure a continuous path. Bypasses 69 may be used at station locations, such as wire loops or self-closing connectors. Alternatively, bypass switches 72, 74 may be provided for shunting wiring concentrator outputs not used. In the preferred IBM Token-Ring Network, a trunk connection unit (TCU) 75 is provided for each wiring lobe, including an insertion relay 74 activated by a phantom drive circuit 67 in the attached unit which applies DC voltage across the input and output circuits of the wiring lobe 19. Further details of the IBM Token-Ring Network and alternate wiring scheme are known (see, e.g., IEEE NETWORK, vol. 1, No. 1, Jan. 1987; ANSI/IEEE Std. 802.5 (1985)).

Operation of such an installed system with medium adapters 10 according to the present invention is shown in FIG. 4. For baseband communication over the shielded pair wiring, the transmitting means may comprise a low impedance dual voltage transmitter 30. Means 32 for isolating the transmitter 30 is shown as a pair of switches which, as shown in connection with medium adapter d, are normally open in the quiescent state. Means 23 for coupling the terminating impedance 25 also is shown comprising a switch which is normally open in the quiescent state. Ring breaking means 50 is shown as a pair of switches bridging between the send and receive pairs in the wiring lobe 19, said switches being normally closed in the quiescent state.

Medium adapter 10f is shown in its transmit mode, with transmitter 30f functionally coupled to the transmission medium (the send pair of wiring lobe 19) via transmitter coupling means 35f which are in their transmit state. Ring breaking means 50f is in its second, ring breaking state, such that the send and receive pairs of wiring lobes 19f are disconnected and no longer form a loop. Thus a bus topology transmission path beginning and ending at station f is established. All attached stations (d, e) in their quiescent state will receive the signal 31f transmitted by station f, as will station f itself.

Figure 5:
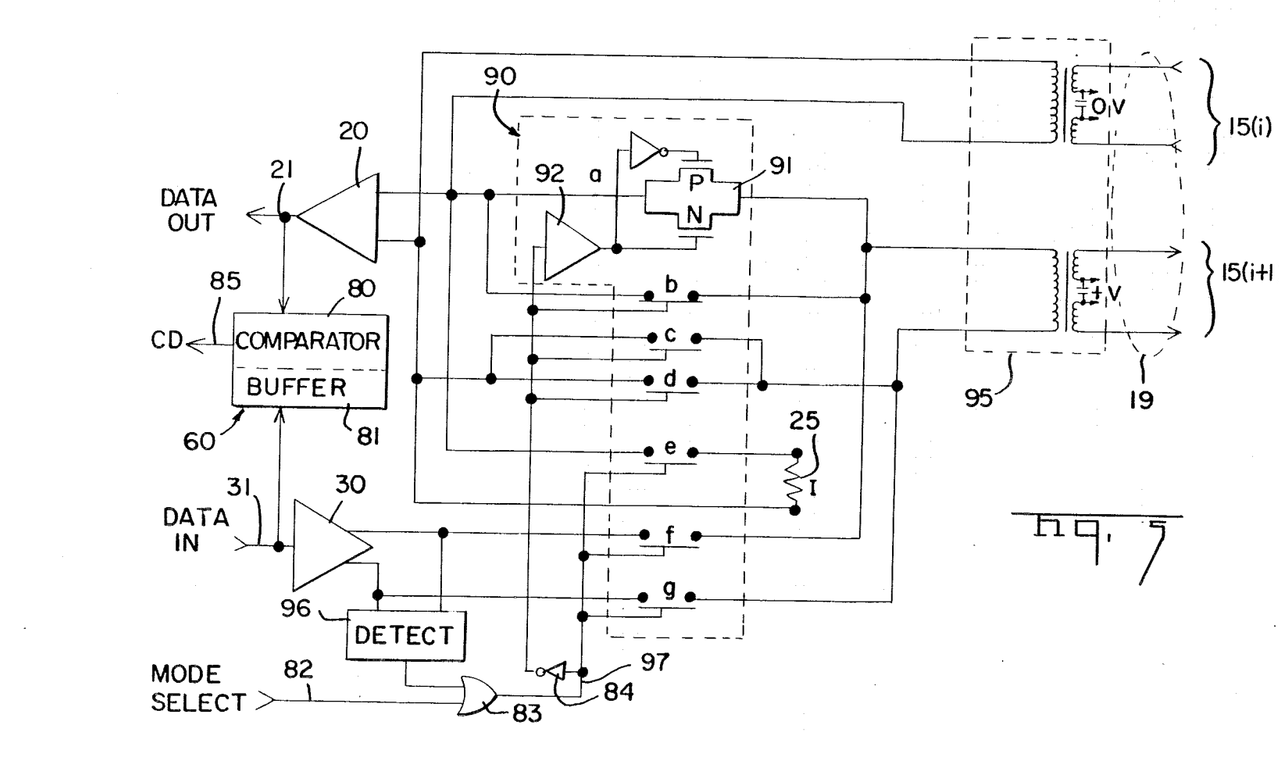
FIG. 5 is a block schematic drawing of one embodiment of the medium adapter of the present invention which may be used, for example, in the system of FIG. 4.

FIG. 5 is a block schematic diagram of a preferred embodiment of a medium adapter 10 which may be used with the system described in, for example, FIG. 4. As shown in FIG. 4, the means 32 for isolating the transmitting means 30 may comprise switch elements 90f, 90g. In a system operating at 10 Mbs, to accomplish switching within a desirably short period, such as 1.5 to 3 bits of the synchronization message, the switching times should be in the range of 0.15 to 0.3 microseconds. In addition, to provide for efficient coupling the coupling means 32 should preferably have low impedance, particularly with respect to the impedance of the transmission medium. In addition, the switches must have adequate frequency characteristics to accommodate signals at the anticipated frequencies. Junction FET CMOS electronic switches are used in the preferred embodiment, such as Harris Part No. HI-5047A or its equivalent. Such solid-state switches have ON resistance (25 ohms typical) which is less than the characteristic impedance of the transmission line (150 ohms for shielded pair). It is understood, however, that the present invention is not limited to use of such devices. Other coupling means providing the desired characteristics may also be utilized. For example, in broadband applications PIN diodes may be used in manners known in the art to provide the desired coupling function.

Separate coupling means, e.g. switch elements 90f and 90g, are preferably provided for each output conductor of the transmitter 30 in order to maintain a balanced transmission line. Specifically, shielded pair wiring is a balanced medium having equal impedance to ground for each conductor. By using similar coupling means 32 for each conductor of the pair the balanced nature is maintained, reducing signal radiation and susceptibility to reception of external noise. When isolating transformers such as baluns are used, a single switch coupling one output conductor of the transmitter may be used without unbalancing the medium. The coupling means 32 may be incorporated with the transmitting means, such as a switched voltage source incorporating switching elements within the transmitter itself so that the transmitter exhibits a suitably high impedance when off.

A representative solid-state switch of the type described is shown as element a of the switch component 90. Isolator 92 isolates the control input from the MS gates 91 to provide protection from electrostatic discharge.

In the preferred embodiment the ring breaking means 50 comprises switch elements 90a-d. Two switch elements are used in parallel between each incoming and corresponding outgoing conductor of the twisted pairs of wiring lobe 19 to reduce the impedance introduced by the ring breaking means 50 of each medium adapter 10. Alternate means may similarly be used.

Finally, terminating impedance coupling means 23 is provided by switching element 90e, although other coupling means may similarly be used. In the preferred embodiment for use with dual shielded pair cables, which typically have an impedance of 150±15 ohms, the terminating impedance 25 is 150 ohms. Terminating impedance 25 may be made selectable or variable to allow a single adapter 10 to be used with differing media having different characteristic impedance. Coupling means 23 may alternatively be provided for both connections of terminating impedance 25 to the medium segment 15.

A standard embodiment of the 802.5 phantom drive circuit is illustrated as means 95 for impressing DC voltages on the wiring lobe 19 in accordance with known 802.5 TCU specifications. When the medium adatper 10 is intended for use with systems not including the bypass feature of the TCU, means 95 may be omitted. Connecting plugs (not shown) may be used to interface the medium adapter 10 to the transmission medium segments 15, or in a preferred embodiment the medium adapter may be incorporated into the connecting plug.

During normal operation, only a single medium adapter 10 may be in its transmit mode at one time if all stations are to receive the transmitted signal. If two or more medium adapters are in their transmit mode, a corresponding number of linear buses will be created, each terminating at the next-successive transmitting station. To assure accurate communication, several bus control protocols may be used with the present system, including token passing (e.g. IEEE 802.4) which avoids simultaneous transmission, and CSMA/CD (e.g. IEEE 802.3) schemes which detect collisions so retransmission can be made as needed. This is a very special property of the particular communication system disclosed, for no known alternative configuration of an entirely passive medium with loss can support both token and contention bus protocols.

The preferred embodiment supports CSMA/CD protocol conforming to the IEEE 802.3 standards. Specifically, each station monitors the transmission medium 15 when in the quiescent state, and may go to the transmit state only when the medium is quiet. Means 60 are provided for detection of collisions, which occur when a second adapter goes into the transmit mode before the existing activity of a first adapter has been detected. In a preferred embodiment, a copy of the preamble of the transmitted message is stored in buffer 81 for comparison by comparator 80 to the signal received by the transmitting station from the bus after propagation delay inherent in the transmission medium. If the received signal is identical to the transmitted signal, the transmission path was complete and all attached medium adapters 10 has access to the transmitted signal. Other methods of message comparison may similarly be used, such as comparing "signatures" of digital data by comparing cyclic redundancy checks (CRC) of the transmitted and received data.

If, however, another station attempted transmission simultaneously, the resulting topology would resemble two linear buses, not the desired loop, and the transmitted signal will not return. These occurrences are detected by comparator 80 and a collision signal 85 is generated which may be provided to, for example, 802.3 CSMA/CD AUI cards in attached computer work stations. Thus, existing 802.3 interfaces may be used in conjunction with standard 802.5 installed wiring. In such a configuration as shown in FIG. 4, the medium adapters 10 replace the coaxial cable transceivers typically used with 802.3 coaxial cable buses.

In order to switch to a transmit mode, the medium adapter 10 must know that transmission by the attached equipment is desired. This may be accomplished by providing a separate data signal, although it is preferable to reduce the need for control lines between the equipment and the adapter 10. In a preferred embodiment, therefore, a signal detector 96 is provided which determines when an input signal 31 has been provided by the attached equipment. When no signal is present, the state control signal 97 is low, such that transmitter coupling switches 90f, 90g and terminating impedance coupling switch 90e are all in their normal, open state. Inverter 84 provides a high signal to ring breaking switches 90a–d, so that they are in their normal, closed state. When a data signal appears, state control signal 97 goes high and causes all aforementioned switches to go their transmit states. Because of the low impedance of the transmission path, less transmitted power is required for communication so that signal detector 96 may divert sufficient power from the transmitter 30 output to drive the switches without detracting from system performance.

External mode selection signal 82 may also be provided, either in conjunction with signal detector 96 by means of a control means, such as OR gate 83, or alone. In the configuration illustrated, when the mode select signal 82 is high, the medium adapter 10 will be forced to its transmit mode regardles of the presence of input data.

By providing all attached medium adapters 10 with such a selector, the medium adapters 10 of the present invention may alternatively be used for active ring topology communication without physical modification to the system. Specifically, when a high mode select signal 82 is presented to every adapter 10, each transmission medium segment 15 is isolated. All interconnecting segments are terminated by terminating impedances 25; attached continuously to the transmitter 30 of the previous medium adapter 10; and coupled to the receiver 20 of the next successive medium adapter 10. By providing suitable signal processing in the attached equipment so that a received signal is echoed back to the transmitter in manners common to standard active ring networks, such as the IBM Token-Ring Network, a system having the benefits of both active ring and passive bus architectures is provided. Thus, the medium adapters 10 of the present invention may alternatively be used to fully support the IEEE 802.5 token ring standards, or any other active ring protocol.

This election of the permanent transmit mode by mode select signal 82 may be made in a number of ways. A switch or other status selection device may be provided with each medium adapter 10, which can be semi-permanently configured by the installer. Thus a single adapter may serve multiple functions, and may be reconfigured as needs change. Such selection may also be provided by a control signal from the attached equipment, either by hardware or software methods known in the art.

The medium adapters 10 also provide a fully adaptable communication system which may be reconfigured at will be command instructions. For example, the received signal may be monitored for a unique command word which selects the desired active mode of the medium adapter 10. When the command word is distributed on the network by any chosen station, it causes stations to change to the desired mode at a chosen time, or upon occurrence of some chosen event.

Figure 6:
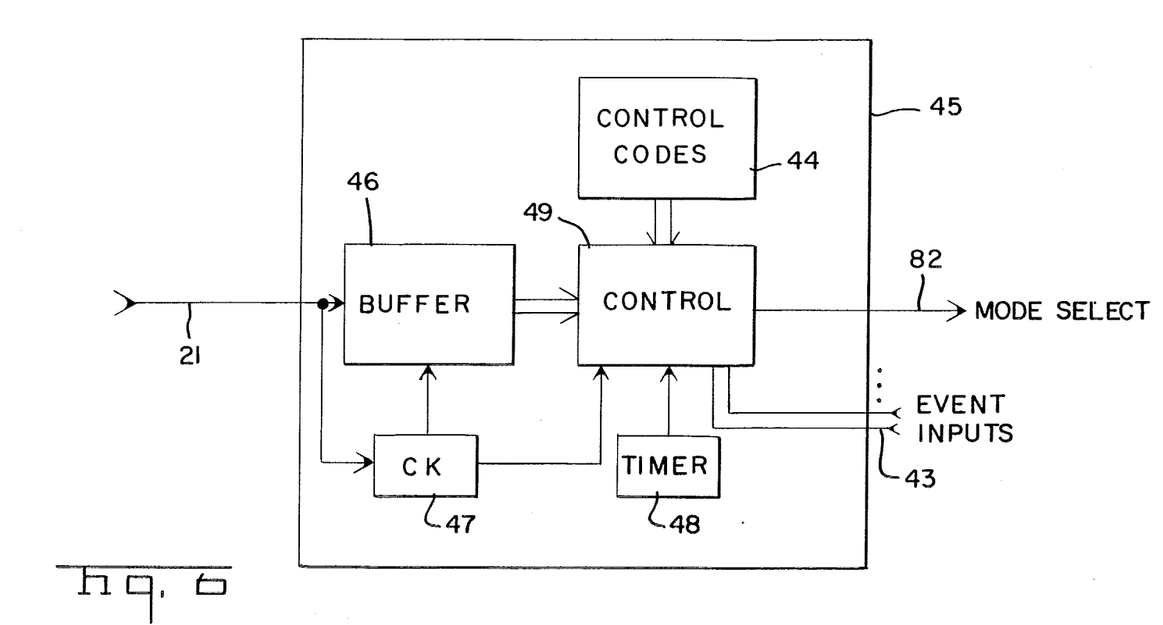
FIG. 6 is a block diagram of one embodiment of a mode controller that may be employed with the present invention.
Figure 7:
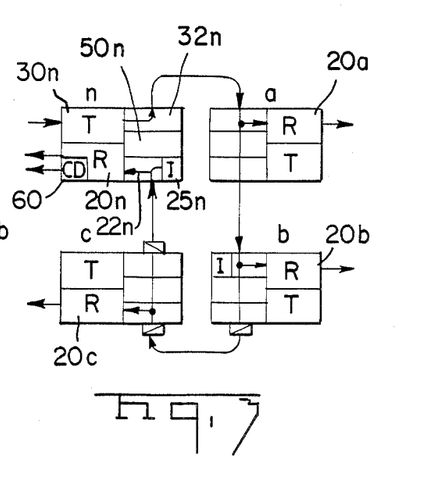

FIG. 6 shows one embodiment of such a mode controller 45. Buffer 46 deserializes the received data. Clock 47 is provided to synchronize the buffer to the received data 21. Control 49 then compares the received data to a set of control codes 44. For example, control 49 may comprise a microprocessor, and control codes may be stored in non-volatile memory. When a control code is received, control 49 generates the appropriate mode select output 82. Triggering events may also be utilized, such as timer 48, to provide mode selection at desired times or upon occurrence of other events 43.

The mode select output 82 may also be utilized by the interface of the attached equipment to select the appropriate active protocol. For example, an interface may be provided with circuitry to support both CSMA/CD under 802.3, and token-ring communication under 802.5, or others, as well as means for selecting the appropriate active protocol. The mode controller 45 and its functions may be incorporated in the interface, in the attached equipment (e.g. processing devices), or may be included with the medium adapter 10. It is understood that other means and methods for generating the desired mode select signal 82 may similarly be employed.

The resulting system may be adapted to suit changing needs at any time. It may, for example, be commanded to support active ring communication during office hours, at which time the attached equipment may operate, for example, according to an isochronous TDM protocol suited for voice communications. At night the system may be automatically reconfigured to the bus topology discussed in connection with FIGS. 1-3 to support, for example, heavy data communication between a few stations including data processing and storage devices. These capabilities offer flexibility to the designer and user, providing a low-cost system adaptable to meet both long and short range changing requirements. The benefits of both standard bus and ring topologies are provided, as well as additional benefits unique to the present communication system. Medium adapters are provided which can allow industry standard wiring schemes to support all recognized protocol standards as well as others and make the benefits of each available to the user, while also providing unique new advantages and possibilities.

It is understood that a wide range of changes and modifications can be made to the preferred embodiments described above without departing from the scope of the present invention as set forth in the attached claims. It is therefore intended that the foregoing detailed description be regarded as illustrative rather than limiting, and that it is the following claims, including all equivalents, which are intended to define the scope of this invention.

I claim:

1. A medium adapter for use in a communication system having multiple transmission medium segments in a ring configuration forming a system communication path, comprising:

means for receiving signals from a first transmission medium segment;

means for transmitting signals over the next-successive transmission medium segment;

means for selectively coupling or isolating said transmitting means with respect to said next-successive segment;

means not including said transmitting means operatively connected to said first segment and said next-successive segment and said breaking means or breaking the continuity of a segment communication path from said first segment to said next-successive segment; and means for controlling said transmitter coupling means and said breaking means such that said transmitting means is isolated from said next-successive segment and said breaking means maintains continuity of said segment communication path when said control means is in a first state and wherein said segment communication path assumes a ring topology when said control means is in said first state, and such that said transmitting means is coupled to said next-successive segment and said breaking means breaks the continuity of said segment communication path when said control means is in a second state and wherein said medium adapter is operable to initiate a bus formed over said system communication path when said control mens is in said second state.

2. The medium adapter of claim 1 further comprising: segment terminating impedance; and means for selectively coupling or isolating said segment terminating impedance with respect to said first segment.

3. The medium adapter of claim 2 further comprising: means for controlling said terminating impedance coupling means such that said segment terminating impedance is isolated from said first segment when said impedance control means is in said first state, and such that said segment terminating impedance is coupled to said first segment when said impedance control means is in said second state.

4. The medium adapter of claim 3 wherein said control means further includes means for determining when signal transmission is desired; and means for causing said control means to assume said second state in response to said signal determining means when transmission is desired, and to otherwise assume said first state.

5. The medium adapter of claim 4 wherein said control means further includes means for causing said control means to assume said second state in response to a mode select signal.

6. The medium adapter of claim 2 wherein said transmitter coupling means, said terminating impedance coupling means, and said breaking means comprise switches.

7. The medium adapter of claim 2 wherein the transmission medium segments include first and second conductors, and wherein said breaking means comprises first and second electronic switches operatively connected between the first and second conductors of said first segment and the corresponding first and second conductors of said next-successive segment 8. The medium adapter of claim 7 wherein said transmitting means includes first and second output terminals, and wherein said transmitter coupling means comprises third and fourth electronic switches operatively connected between the first and second conductors of said next-successive segment and said first and second terminals of said transmitting means.

9. The medium adapter of claim 8 wherein said segment terminating impedance includes first and second ends, said first end coupled to one of said first and second conductors of said first segment, and wherein said terminating impedance coupling means comprises a fifth electronic switch operatively connected between the other of said first and second conductors of said first segment and said second end of said segment terminating impedance.

10. A communication system serving a plurality of stations connected serially by transmission medium segments, each station including a medium adapter for interfacing station equipment to a first transmission medium segment and to the next-successive transmission medium segment, said medium adapters including means for receiving signals from said first segment and means for transmitting signals on said next-successive segment, said segments and medium adapters forming a physically closed ring, characterized by:
said medium adapters having at least two operative states including a quiescent state and a transmit state;
said medium adapters including means operatively connected to said first segment and to said next-successive segment for selectively maintaining the continuity of a communication path from said first segment to said next-successive segment when in said quiescent state, or breaking said continuity when in said transmit state, such that the communication path formed assumes a ring topology when each of said breaking means is in said quiescent state and a bus topology when one medium adapter is in the transmit state,
said bus initiating and terminating at the respective transmitting station.

11. The communication system of claim 10 wherein said medium adapter further comprises means for coupling said transmitting means to said next-successive segment when in said transmit state, and isolating said transmitting means from said next-successive segment when in said quiescent state.

12. The communications system of claim 10 wherein said medium adapter further comprises:
segment terminating impedance; and
means for coupling said segment terminating impedance to said first segment when in said transmit state, and isolating said segment terminating impedance from said first segment when in said quiescent state.

13. The communications system of claim 10 wherein said medium adapter further comprises:
means for coupling said transmitting means to said next-successive segment when in said transmit state, and isolating said transmitting means from said next-successive segment when in said quiescent state;
segment terminating impedance; and
means for coupling said segment terminating impedance to said first segment when in said transmit state, and isolating said segment terminating impedance from said first segment when in said quiescent state.

14. The communication system of claim 10 further comprising:
means at each station for receiving state control instructions; and
means for selecting the operative state of the medium adapter associated with each such station in response to said state control instruction.

15. The communication system of claim 10 further including means at each station for controlling station communications over said communications network according to two or more differing protocols, said system further comprising:
means at each station for receiving state control instructions;
means for selectively activating one of said controlling protocols at each such station in response to said state control instruction; and
means for selecting the operative state of the medium adapter associated with each such station in response to said state control instruction.

16. A method of controlling a communication system including a plurality of stations connected serially by transmission medium segments, each station including a medium adapter for interfacing station equipment to a first transmission medium segment and to the next-successive transmission medium segment, said transmission medium segments and medium adapters forming a physically closed ring and establishing a communication path, comprising the steps of:
when said medium adapters are in a receive state, causing said communication path to assume a ring topology, said step including coupling said first segment to said next-successive segment at each medium adapter;
coupling a means for receiving signals to the first segment at each medium adapter when in said receive state;
causing the medium adapter associated with a station which desires to transmit a signal over the system to assume a transmit state and causing said communication system to assume a bus toplogy wherein said bus initiates at said station which desires to transmit, said step including decoupling said next-successive segment from said first segment at said transmitting state medium adapter, and coupling a means for transmitting signals to said nextsuccessive segment at said transmitting state medium adapter; and
returning said transmitting state medium adapter to said receive state after transmission.

17. The method of claim 16 further comprising the step of decoupling said transmitting means from said next-successive segment when said medium adapter is in said receive state.

18. The method of claim 16 further comprising the steps of:
coupling a terminating impedance to said first segment when said medium adapter is in said receive state, and
isolating said terminating impedance from said first segment when said medium adapter is in said transmit state.

19. The method of claim 16 further comprising the steps of:
sensing when more than one medium adapter is in the transmit state at substantially the same time, and generating a collision detect signal.

20. A method of controlling a communication system including a plurality of nodes connected serially by transmission medium segments forming a communication path, each node attached to a first transmission medium segment and to the next-successive transmission medium segment, comprising the steps of:

causing said communication path to assume a ring topology when said node is in a first state, said step including coupling said first transmission medium segment to said next-successive transmission medium segment at each node;

when a node desires to transmit, causing said communication path to assume a bus topology wherein said bus initiates at said node which desires to transmit and causing said node to assume a second state, said step including decoupling said next-successive transmission medium segment from said first transmission medium segment at said second state node, and coupling a means for transmitting signals to said next-successive transmission medium segment at said second state node; and thereafter returning said second state node to said first state.

21. The method of claim 20 further comprising the step of decoupling said transmitting means from said next-successive transmission medium segment when said node is in said first state.

22. The method of claim 20 further comprising the steps of:

coupling a terminating impedance to said first transmission medium segment when said node is in said first state, and isolating said terminating impedance from said first transmission medium segment when said node is in said second state.

23. The method of claim 20 further comprising the steps of:

sensing when more than one node is in said second state at substantially the same time, and generating a collision detect signal.

24. The method of claim 20 further comprising the steps of:

providing a state control signal to each node; and causing each node to assume one of said states in response to the state control signal.

* * * * *